Jan. 6, 1959

J. F. SHANNON 2,867,229

CONTROL SYSTEMS WITH PROPORTIONAL BAND SELECTING MEANS

Filed Feb. 27, 1956

INVENTOR.
JACK F. SHANNON
BY Arthur L Wade
ATTORNEY

Jan. 6, 1959  J. F. SHANNON  2,867,229
CONTROL SYSTEMS WITH PROPORTIONAL BAND SELECTING MEANS
Filed Feb. 27, 1956  4 Sheets-Sheet 2

INVENTOR.
JACK F. SHANNON
BY Arthur L. Wade
ATTORNEY

INVENTOR.
JACK F. SHANNON
BY Arthur L. Wade
ATTORNEY

Jan. 6, 1959   J. F. SHANNON   2,867,229
CONTROL SYSTEMS WITH PROPORTIONAL BAND SELECTING MEANS
Filed Feb. 27, 1956   4 Sheets-Sheet 4

INVENTOR.
JACK F. SHANNON
BY Arthur L. Wade
ATTORNEY

United States Patent Office 2,867,229
Patented Jan. 6, 1959

2,867,229

CONTROL SYSTEMS WITH PROPORTIONAL BAND SELECTING MEANS

Jack F. Shannon, Euclid, Ohio, assignor to Bailey Meter Company, a corporation of Delaware Application February 27, 1956, Serial No. 568,123

11 Claims. (Cl. 137—85)

My invention relates to systems and apparatus for indicating, recording, or otherwise exhibiting and/or controlling the value of a position, measurement or variable. More particularly, the invention relates to such systems wherein a fluid pressure is established representative of that which is to be measured or controlled, and then the fluid pressure is used to actuate an exhibiting or controlling device. While not necessarily so limited, the invention is particularly adapted and useful in fluid pressure telemetering systems employing air under pressure as the active motive fluid and is so disclosed herein by way of example only. This application is a continuation-in-part of application Serial No. 318,992 filed November 6, 1952, now Patent No. 2,743,710, granted to me on May 1, 1956.

In many instances the physical location of the measuring point may be far removed from the location of a control valve; and both, a considerable distance from availability to the operator who should be able to observe the value of the variable, the effect of the regulation, as well as to have available the possibility of removing the system from "automatic" and placing it under "manual" control.

Fluid pressure telemetering is known wherein a fluid pressure is developed continuously bearing a relation to the value of the variable or to the extent and direction of departure of the value from desired standard or setpoint. Such a measuring-controller is a transmitter which may be indicating and recording and may preferably be located adjacent the desirable point of measurement of the variable, for many reasons. The fluid loading pressure is transmitted to a control valve for positioning the same, and the transmitter and valve may be widely separated. Intermediate the two is a manual-automatic selector station which may be conveniently located upon a control panel, with other measuring and controlling instrumentalities at a central location, under observation of an operator. It is frequently necessary, in such a system, to have one or more fluid pressure relays and these are preferably functionally located intermediate the transmitter and the selector station so that the relay effects may be available upon the regulating valve through the selector station but, under "manual" control, the relay is not effective upon the regulating valve as would be the case were it functionally located between the selector station and the regulating valve.

The fluid pressure relay, or relays, receiving the fluid loading pressure which is representative of the variable, establish an output control pressure which may be of the same, or of a different magnitude, for actuation of the receiver mechanism. Frequently such relays are employed to give the algebraic summation of two or more individual loading pressures, to double or half the loading pressure value, to ratio it, or to otherwise modify the loading pressure representative of one or more variables into a resultant outgoing control pressure bearing a determined value relationship to the measurement variable or variables. The relays are usually physically located intermediate the point of measurement and the point of exhibiting or controlling. Usually they are of the force-balance, position-balance, or force-position-balance type and employ expansible-contractible pressure receiving chambers having a movable wall for varying a force or position system. Common types include bellows or diaphragms of various materials.

This invention provides an improved relay of a force-position-balance type having a plurality of force-balance systems interrelated by position-balance. Such a basic relay type is disclosed and claimed in the copending application of Harvard H. Gorrie S. N. 311,098, filed September 23, 1952, now Patent 2,776,669 granted January 8, 1957, owned by the present assignee and is provided with proportional band or sensitivity adjustments which are arranged for manual manipulation. The present invention provides improvements thereover, including means for remotely manually varying the sensitivity or proportional band setting of the relay, varying the sensitivity in accordance with a variable, or automatically changing the sensitivity of the relay responsive to one or more variables which are preferably applied by fluid pressure means.

A principal object of the invention is in the provision of a force-position-force-balance relay having a sensitivity or proportional band adjustment remotely positionable or automatically adjustable in accordance with one or more variables.

Another principal object of the invention is to provide a force-position-force-balance relay with structure which characterizes the effect of an adjusting signal on the sensitivity or proportional band.

Another principal object of the invention is to provide a force-position-force-balance relay with structure, characterizing the effect of an adjusting signal on the sensitivity or proportional band, which is capable of being precalibrated.

Another principal object of the invention is to provide a force-position-force-balance relay with structure, characterizing the effect of an adjusting signal on the sensitivity or proportional band, which includes an electric motive means responsive to the adjusting signal.

Other objects will appear in the course of the following description.

In the drawings:

Fig. 1 illustrates a type of apparatus to which the present invention may be applied which has a fluid flow ratio control system wherein the ratio is established by a variable condition or value acting through a fluid pressure relay having remotely actuable sensitivity changing possibilities, by means of a fluid pressure established representative of a variable, position, condition, or the like.

Figure 1:
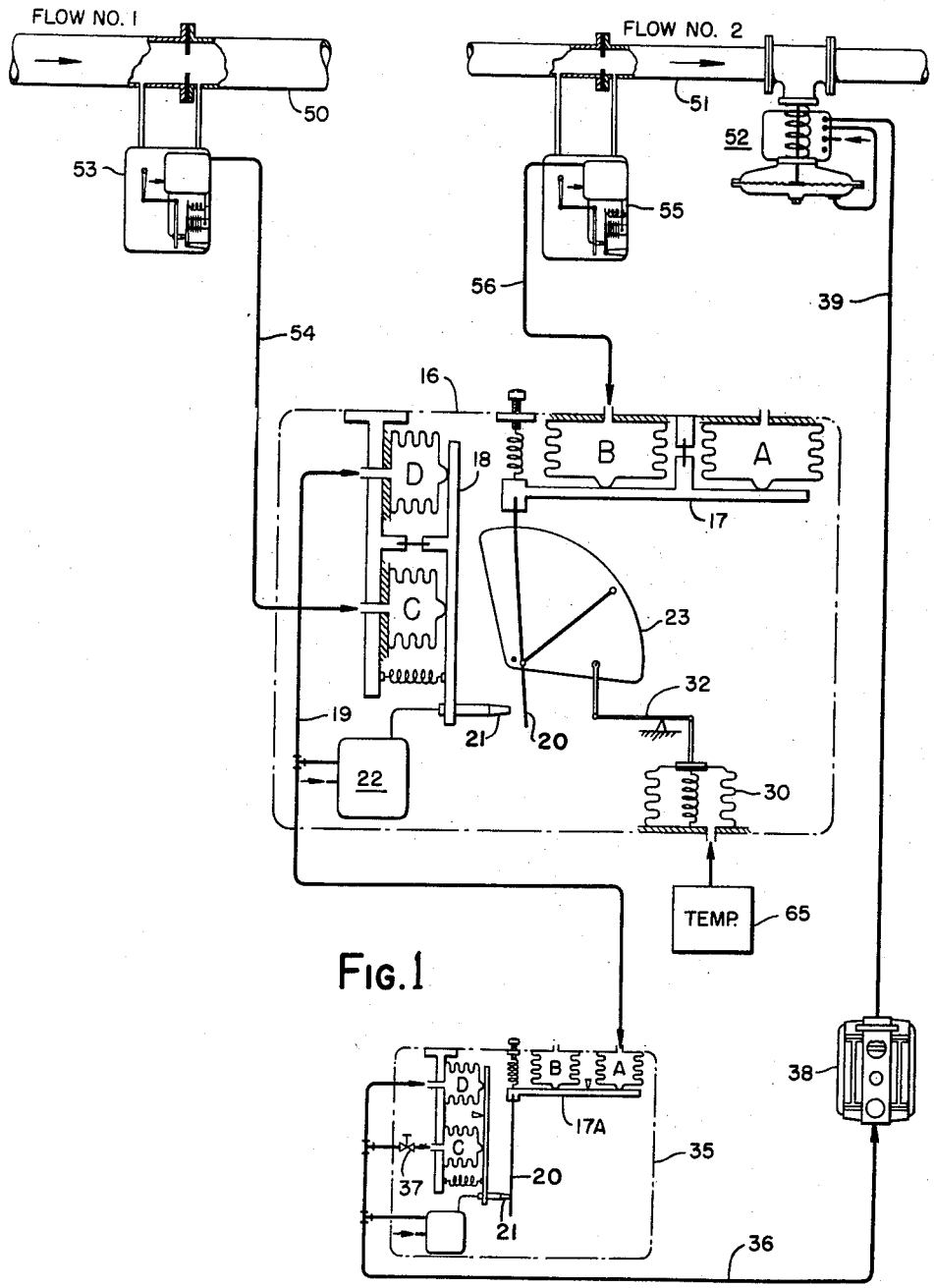

In Fig. 1, there is illustrated a flow control system which automatically ratios one fluid flow to another and allows the resetting of the ratio in accordance with a third variable. The problem specifically illustrated and described is representative, or by way of example only.

In a chemical treatment process two fluids are desirable to be maintained at a predetermined ratio at one temperature, but with the ratio desirably different at other temperatures. The temperature may be of one or the other of the component flows, of the mixture, or any desired temperature. In fact, the ratio adjusting variable need not be temperature but may be pressure, pH, viscosity or some other variable.

The meters 53 and 55 are flow rate meters for the fluids flowing in conduits 50 and 51 respectively and are arranged to establish pneumatic loading pressures in the pipes 54 and 56 which bear linear relation to the respective flows. The dictator Flow No. 1 has its loading pressure applied to the expansible C chamber of a pneumatic relay 16 while the slave or follower Flow No. 2 has its representative fluid loading pressure applied to the expansible B chamber thereof. Such a relay is provided with a nozzle-baffle couple 20, 21 as described in the parent application and with a booster relay 22, all as more fully disclosed in the pending application 289,409, now Patent No. 2,714,041, of Gorrie et al. and owned by the present assignee. The A chamber is an idle chamber open to the atmosphere and mechanically connected by balance beam 17 to chamber B. The output of booster relay 22, available in output pipe 19, is applied to the balancing D chamber for the force-beam 18. The pressure in pipe 19 is further applied to the A chamber of standardizing relay 35 whose output, in pipe 36, acts through the manual selector station 38 and pipe 39 to position the control valve 52 for Flow No. 2. Under certain conditions the pipes 54 and 56 may desirably be interchanged as to chambers C and B, or as to C and A.

Relay 16 is a ratio relay with its proportional band setting determining the ratio between force-beam 17 and force-beam 18. Were the pivoted sector 23 to remain in a preselected position then a uniform ratio would be had between Flow No. 1 and Flow No. 2. The dictator flow, applied to the C chamber, upsets the balance of force-beam 18, resulting in a change in D chamber pressure which tends to balance the force-beam 18 against the new C chamber pressure while, substantially simultaneously, the change in flow through the conduit 51 is in proper direction to affect the force-beam 17 and the nozzle-baffle relationship. With the proportional band adjustment intermediate the beams 17, 18, any change in flow rate in conduit 50 will result in a new flow rate within conduit 51 in desired ratio to the dictator rate when the relay system has balanced out.

Device 65 represents a controller establishing a fluid loading pressure for bellows 30 continuously representative of a temperature. Inasmuch as the bellows 30, acting through linkage 32, positions the proportional band sector 23, it will be apparent that the ratio between the two flows of conduits 50 and 51 may be varied in accordance with a temperature condition or any similar variable which may be applied as through 65 to the bellows 30.

The connection between bellows 30 and sector 23, disclosed in the preceding drawing, has been indicated as having the possibility of adjustment of the linkage between the two. Further, specifically in Fig. 6, of my parent case now Patent 2,743,710, previously referred to, the possibility of a characterizing slot 60 has been illustrated and described. More individual forms of connecting structure between bellows 30 and sector 23 will now be disclosed.

Figure 2:
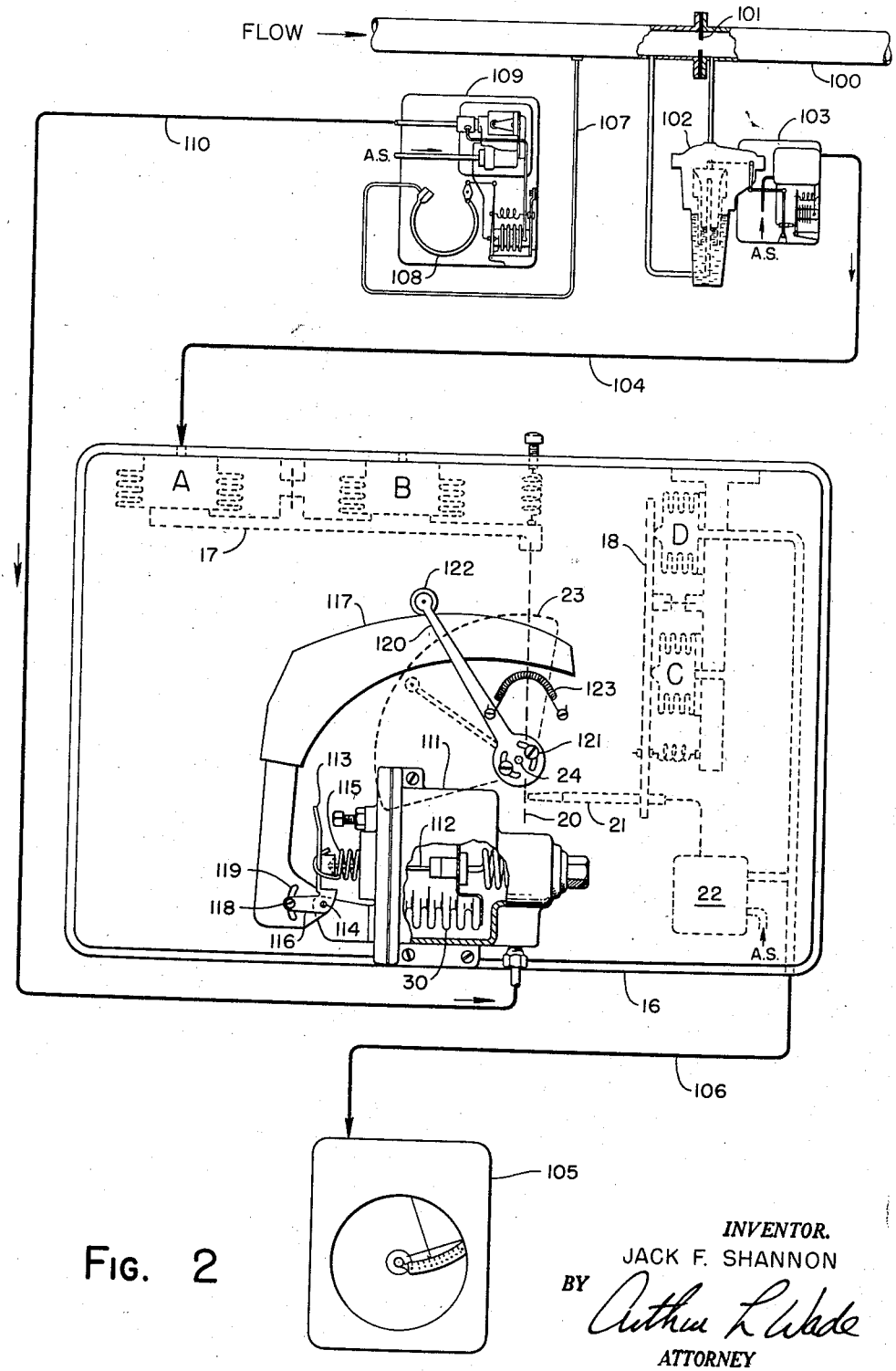
Fig. 2 illustrates characterizing structure, including a cam, on the relay, compensating for pressure in a system for flow measurement.

In Fig. 2, relay 16 has been shown from the rear of its casing, in contrast to the disclosure of the preceding figure. The essential components, including the bellows A—B—C—D, beams 17 and 18, vane 20, nozzle 21, and booster relay 22 are shown in dotted lines, as they are viewed through the rear wall of the case. Fixed pivot 24 for the sector 23 is now defined by a shaft extending through the wall of the case to actuate sector 23 from structure mounted on the rear wall of the case and in full view in Fig. 2. Bellows 30 has now been shown mounted in its individual casing, on the rear wall of relay 16, from where it turns pivot shaft 24 to position sector 23.

The complete system of Fig. 2 illustrates, in diagrammatic form, how a fluid pressure signal representative of fluid flow rate may be automatically compensated for variations of the pressure of the flowing medium.

It is generally appreciated that fluid flow rate meters are calibrated in units of pounds per hour. A restricting element is established in the flow, within its conduit, and designed to give a particular range of head differential for given values of pressure and temperature of the flowing medium. The flow rate in pounds per hour is proportional to the square root of the specific weight in pounds per cubic foot, the head differential being held constant. Therefore, a deviation in either pressure or temperature of the fluid will change the specific weight and cause the flow rate meter to manifest an erroneous value.

Fig. 2 specifically discloses a system for compensating a flow rate signal for deviations in pressure of the flowing medium. However, it should be appreciated that compensation may be accomplished in a similar manner for deviations in temperature. Further, I have shown one form of connecting structure between bellows 30 and shaft 24, including a cam whose contour provides a characterizing element between the bellows 30 motion and the motion of shaft 24. An alternate form of connecting structure, utilizing simple linkage, will be subsequently disclosed.

The flowing medium whose flow rate is to be manifested is transported in conduit 100. Orifice 101 is mounted as a restricing element in conduit 100. The resulting differential pressure across orifice 101 positions a bell within casing 102, shaped to float vertically, on mercury, over a linear range within casing 102. The motion of the bell is transmitted, by mechanical linkage, to transmitter 103, similar to the transmitter shown in the preceding drawing figure. The fluid pressure output of transmitter 103 is developed in pipe 104 as representative of the flow rate of the fluid medium flowing in pipe 100.

In the system disclosed in Fig. 2, the effect of the fluid pressures in pipe 104 are to be imposed on recorder 105. Direct imposition of the pressures in pipe 104, on recorder 105, would result in accurate manifestation of the values of fluid flow rate in conduit 100 as long as the temperature and pressure of the flowing medium remained at the value for which orifice 101 was designed. However, in contemplation of a variation of these values, the disclosed form of relay 16 receives the pressures of pipe 104 and develops pressures in pipe 106 which are directly proportional thereto over a range of pressure variation in the flowing medium of conduit 100.

The pressure in the flowing medium of conduit 100 is sensed by pipe 107, connected to Bourdon tube 108 whose motion is transmitted to the mechanism of transmitter 109, similar to transmitter 103 in this respect. The result is a fluid pressure developed in pipe 110 which is proportional to the pressure of the flowing medium in conduit 100.

The pressure in pipe 110 is taken into casing 111 in which is mounted bellows 30. The result is that bellows 30 moves over a range in response to pressure variations of the medium flowing in conduit 100. This movement of bellows 30 is transmitted to pivot shaft 24 in order to rotate sector 23 through an angle which will affect the range of pressures in output pipe 106 to cause recorder 105 to correctly manifest the actual values of the flow rate of the medium in conduit 100 in terms of pounds per hour.

The motion of bellows 30 is directly transmitted with push-rod 112. Push-rod 112 swings drive lever assembly 113 about pivot 114, mounted to be fixed with respect to casing 111. The pivot between drive lever assembly 113 and push-rod 112 is a conical recess in which push-rod 112 is retained by spring 115.

Cam 117 is also pivoted at 114 and attached to an arm 116 of drive lever assembly 113 by a screw 118 through a slot 119 in cam 117. This provision of adjusting screw 118 in slot 119 permits relative angular movement between drive lever assembly 113 and cam 117 about pivot 114.

To complete the connection between bellows 30 and pivot shaft 24, roller arm 120 is connected by one end to pivot shaft 24 with screws 121 which permit of positional adjustment between shaft 24 and roller arm 120. When this positional adjustment is fixed, the opposite end of roller arm 120 carries a roller 122 which is held in contact with the characterized surface of cam 117 by means of constant force spring 123. Therefore, the motion of bellows 30 is mechanically transmitted to position sector 23 through linkage including the characterizing cam 117 to maintain the output pressure in pipe 106 at a correct manifestation of the flow rate of the fluid medium in conuit 100.

The operation of the system of Fig. 2 may then be considered from a proportional band setting of 100%. The pressure of the flowing medium in conduit 100 is then at its designed value and the output of relay 16 is equal to its input. If the pressure in conduit 100 increases, a greater mass of fluid flows in producing the same head differential as a lesser mass of fluid at a lower specific weight. Without compensation introduced into relay 16, the manifestation of the values of the pressures in pipe 106 would indicate a lower fluid flow rate in pounds per hour than actually exists. However, the pressure increase in conduit 100 may be considered as developing a pressure in pipe 110 which will compensate the pressure of pipe 104 as it develops a pressure in pipe 106.

Specifically, bellows 30 collapses under the increasing pressure of pipe 110, push-rod 112 rotates drive lever assembly 113 about pivot 114 to swing cam 117 counterclockwise. With roller 122 made to follow cam 117, by constant force spring 123, pivot shaft 24 is rotated to narrow the proportional band of relay 16 and increase the output pressure in pipe 106 with respect to the input pressure of pipe 104. A specific, predetermined, shape for cam 117 accomplishes the compensation for deviation from the design operating pressure of the medium in conduit 100.

Obviously, a suitably shaped cam 117 can be developed to compensate for deviation of the temperature of the metered fluid flow from its designed value. With appreciation that an increase in temperature will decrease the specific weight of a fluid metered, the shape of the cam would be determined that would cause a decrease in the fluid pressure value in pipe 110. The proportional band sector 23 would then be moved, through cam 117, to provide a wider proportional band and correspondingly to reduce the output of relay 16 with respect to its input.

It is further obvious that compensation may be accomplished for both pressure and temperature variations by arranging two relays, such as 16, in series. Additionally, certain applications may demand compensation for variables other than pressure and temperature. As an example, compensation for a manifestation of B. t. u. variation due to enthalpy change in feed water within a system-efficiency computing apparatus, may be required. Additionally, in any situation where the correction factors are fixed and subject to precalibration, the use of actuating mehcanism, including a cam, such as disclosed in Fig. 2 may be utilized.

Figure 3:
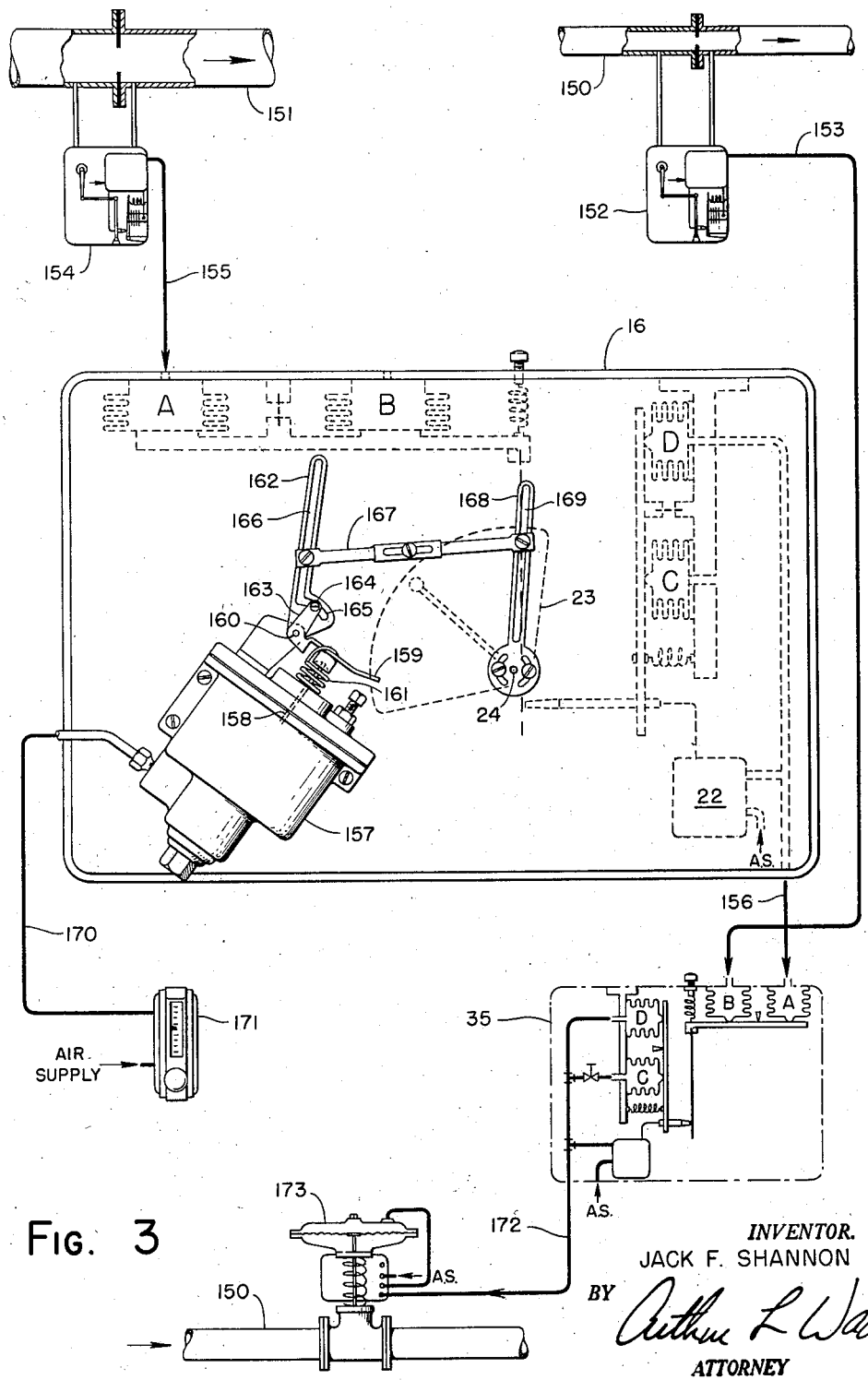
Fig. 3 illustrates characterizing structure, utilizing simple linkage, on the relay, in a system controlling a ratio of two variables.

Fig. 3 has been utilized to disclose a ratio control system. Control of the ratio of the flow in conduit 150 to that in 151 is attained by regulating the flow in one of the conduits, here shown to be that in conduit 150. For ease of illustration, conduit 150 has been shown in two sections, one section being utilized to demonstrate measure of the flow and the other being utilized to demonstrate control of the flow.

The system of Fig. 3 is assumed to be associated with the operation of a steam generator wherein it is desired to vary the relationship between the fuel flow rate and the air flow rate over the range of operating loads. Thus, conduit 150 is assumed to contain fuel being burned to generate the steam, and conduit 151 is assumed to conduct the air to be combined with the fuel in the combustion process. The variation in the ratio is determined in view of the ratio required for optimum firing conditions at various load ratings. As the load is changed, the ratio is changed by manual manipulation of the system. Automatic variation is also possible, but manual manipulation is illustrated here for simplicity.

In Fig. 3, relay 35, previously described, is utilized to balance fluid pressure signals representative of the two variables. Transmitter 152 responds to the fuel flow in conduit 150 to establish a fluid pressure in pipe 153. Transmitter 154 responds to the air flow in conduit 151 to establish a fluid pressure in pipe 155.

The fluid pressure of pipe 153 is received directly in the B chamber of relay 35 to be balanced against the fluid pressure received in the A chamber. The fluid pressure in pipe 155 is received, as an input, in relay 16 to establish a fluid pressure in pipe 156 and the A chamber of relay 35 for comparison with the pressure in chamber B. Relay 16 serves to alter the proportionality between the pressure in input pipe 155 and that in output 156, resulting in an output from relay 35 which will regulate the flow in conduit 150 to adjust the ratio of fuel to air as determined by manual manipulation of relay 16.

Relay 16 in Fig. 3 is similar to relay 16 of Fig. 2 in having bellows 30 mounted on the rear of its casing to rotate sector 23. Specifically, casing 157 is mounted on the back of relay 16 to house bellows 30 which positions a push-rod 158 to rotate a drive lever assembly 159 about a pivot 160 which is fixed to casing 157. A spring 161 retains push-rod 158 in the cone recess pivot of drive lever assembly 159 as it rotates the assembly through an angle about the pivot 160.

Also about pivot 160, slotted drive arm 162 is rotated by assembly 159. Specifically, an extension arm 163 forms a part of the assembly 159 and carries a connecting screw 164 in a slot 165, the slot being formed in drive arm 162. Therefore, having a predetermined angular relationship with assembly 159 drive arm 162 is carried through an angle, about pivot 160, by the movement of bellows 30.

Drive arm 162 has a slot 166 which extends its length. One end of adjustable connecting link 167 is connected to slot 166 with a pivot structure at a predetermined point along its length. The other end of link 167 extends to drive lever 168 which is attached, by a screw and slot combination, to pivot shaft 24. Slot 169 extends the length of this lever 168 and one end of connecting link 167 carries a pivot structure at a predetermined point along this slot.

A simple three-bar linkage between bellows 30 and pivot shaft 24 has now been disclosed. Further, various adjustments of the linkage members, with respect to each other, the bellows 30 and shaft 24 are provided. The ends of link 167 may be placed at various points along the slots 166 and 169 and link 167 is, itself, adjustable in length. Obviously, a wide variation of adjustability, with simple tools, is provided by this structure.

The fluid pressure signal established on bellows 30 of Fig. 3 is developed in pipe 170 by a reducing valve 171. Device 171 may be termed a manual loader which may be manipulated by an operator desiring to readjust the ratio of fuel to air. Again, although this manually adjusted means is disclosed to develop the fluid pressure in pipe 170, it is understood that the adjustment may be done automatically, if desired.

In operation of the system of Fig. 3 it can now be appreciated that the proportionality between the input and output of relay 16 may be varied by manipulation of the manual loader, or reducing valve, 171. This alteration of the fluid pressure in pipe 156, into the A chamber of relay 35, will develop a pressure in the output of relay 35 in pipe 172 which will position valve 173 to adjust the flow of fuel in conduit 150 to give a desired ratio to the flow of air in conduit 151.

The relatively simple three-bar linkage disclosed in Fig. 3 is to be contrasted with the linkage including cam 117 of Fig. 2. The system of Fig. 3 illustrates the use of relay 16 in systems where it is not practical to predetermine the range settings required of the actuating structure between bellows 30 and sector 23. The three-bar linkage illustrated in Fig. 3 then provides means for field adjustment of the linkage which is easier to accomplish than by shaping cam 117. Each of the forms of linkage have their place. In applications for correction or compensation for deviations which lend themself to precalibration, the cam drive linkage can be precalibrated during manufacture, thereby saving much field time in adjusting the system in which it is incorporated.

Figure 4:
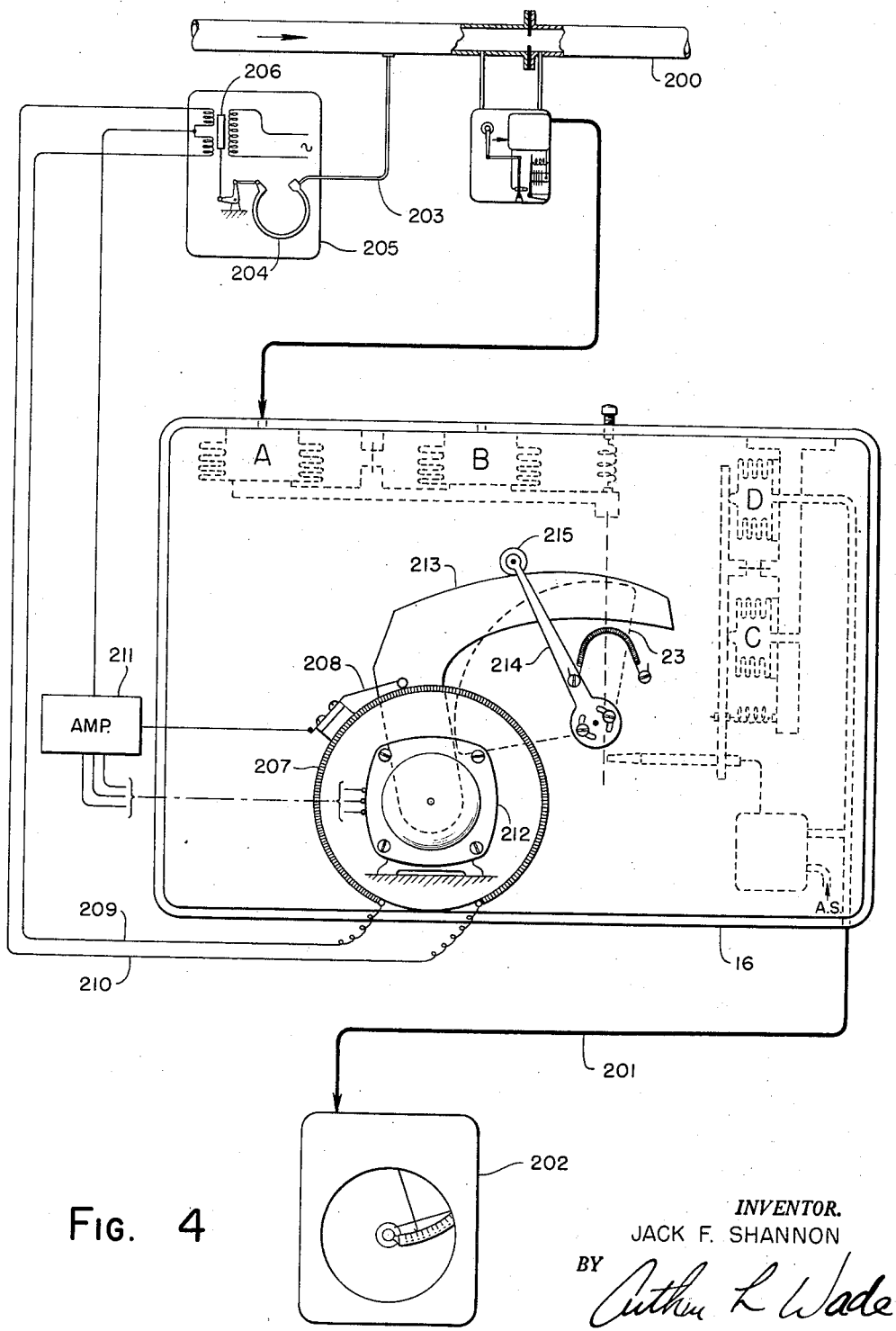
Fig. 4 illustrates characterizing structure, including an electric motor, on the relay, compensating for pressure in a system for flow measurement.

Turning now to Fig. 4, and considering it in connection with Fig. 2, it can be appreciated that the system disclosed is one in which the manifestation of fluid flow rate is compensated for pressure variations from the designed value for the restricting element. Conduit 200 has a fluid flow whose rate is to be manifested and a restrictive element is mounted therein to create differential to which a flow transmitter is responsive in order to develop a fluid pressure proportional to the fluid flow in conduit 200. Relay 16 is shown as receiving the fluid pressure developed by the transmitter in chamber A. The output of relay 16 is established in pipe 201 for manifestation by recorder 202. The pressure of the fluid in conduit 200 is sensed by pipe 203 in order to actuate Bourdon tube 204.

Considered as an entity, transmitter 205 receives the fluid pressure signals of pipe 203 and positions the movable core 206 of a transformer.

The ratio of voltages established in the secondary windings of the movable core transformer, by the position of core 206, is balanced by a potentiometer comprised of a slidewire 207 and contact 208. Movement of contact 208 along slidewire 207 distributes the voltage drop between contact 208 and leads 209 and 210 in a ratio to match the voltage ratio between the two secondary windings of the movable core transformer. If differences occur between these two ratios, a resulting voltage is imposed upon an amplifier and motor control circuit 211 which causes motor 212 to rotate and position slidewire 207 until its resistance is divided by contact 208 to establish a ratio of voltages to match that of the movable core transformer output.

Simultaneously, with the rotation of slidewire 207, cam 213 is positioned to actuate arm 214, through roller 215, in positioning sector 23. The result of this positioning of cam 213 is similar to the result of positioning of cam 117 of Fig. 2. Sector 23 is positioned to change the proportional band of relay 16 and thereby vary the proportionality between its input and output. With cam 213 shaped to account for the pressure variation sensed by pipe 203, the manifestation on recorder 202 by the output pressure in pipe 201 will truly represent the fluid flow rate in conduit 200.

While I have illustrated and described certain preferred embodiments of my invention, it will be appreciated that this is by way of example only, and that I am not to be limited thereby.

Certain subject matter of this application is disclosed and claimed in my parent application S. N. 318,992, filed November 6, 1952, now Patent 2,743,710, granted May 1, 1956.

What I claim as new and desire to secure by Letters Patent of the United States is:

1. A fluid pressure relay of the force-position-balance type including; a first beam pivoted between its ends, a first pair of expansible-contractible fluid pressure receiving chambers acting upon the first beam at opposite sides of its pivot, and loading means for the first beam; a second beam pivoted between its ends, a second pair of expansible-contractible fluid pressure receiving chambers acting upon the second beam at opposite sides of its pivot, and loading means for the second beam; a fluid pressure nozzle-baffle couple establishing the relay output as a fluid pressure determined as a result of variable bleed and having one element positioned by the first beam and the other element positioned by the second beam to adjust the bleed between said elements, and a supply of fluid pressure for the couple; a support for the components of the relay having a wall on one side of which the beams and chambers are mounted; and an adjustable sensitivity means on the other side of the wall arranged to modify the rate of positioning of one of the couple elements by its positioning beam, including, (a) an angularly movable sector having an axis shaft member extending through the support wall, (b) a power means mounted on the external side of the wall and responsive to remotely established variable signals, (c) a mechanical connection between the power means and axis shaft member extending through the casing wall, and (d) means linking a point on said sector and one of said couple elements.

2. The relay of claim 1 in which the adjustable sensitivity means arranged to bias the positioning of one of the couple elements by its positioning beam includes, (a) a responsive means mounted on the other side of the wall and movable responsive to a remotely established signal, (b) a first arm actuated by the responsive means about a point fixed with respect to the wall, (c) a second arm fixed to the axis shaft member, and (d) means connecting said arms for non-linear relative motion.

3. The relay of claim 2 in which the first arm is a cam, and the means actuating it is a fluid responsive means, a push rod actuated by the fluid responsive means, a drive lever assembly pivoted about a point fixed in respect to said support wall and connecting said push rod and said cam, and a roller arm fixed on said axis shaft member and bearing on said cam.

4. The relay of claim 3 in which the cam is pivoted about the drive lever assembly pivot and attached to the assembly through an adjustable screw and slot combination.

5. The relay of claim 4 in which the cam is held in cooperation with the roller of the roller arm by a constant force spring.

6. The relay of claim 5 in which the roller arm is fixed to the axis shaft member through an adjustable screw and slot combination.

7. The relay of claim 1 in which the adjustable sensitivity means arranged to bias the positioning of one of the couple elements by its positioning beam includes, (a) an angularly movable sector having an axis shaft member extending through the support wall, (b) a fluid pressure responsive means mounted on the other side of the wall and responsive to remotely established fluid pressure values, (c) a slotted drive arm pivoted by the fluid pressure means about a point fixed with respect to the wall, (d) a slotted drive lever fixed to the axis shaft member, and (e) a connecting link extending pivot points fixed along the slots of the drive arm and the drive lever.

8. The relay of claim 7 in which the drive arm is pivoted about said fixed point by the fluid pressure means through, a push rod connected to the fluid pressure responsive means, and to an extension from the drive arm.

9. The relay of claim 8 in which the extension is pivoted about the drive arm pivot and attached to the drive arm through an adjustable screw and slot combination.

10. The relay of claim 9 in which the slotted drive lever is fixed to the axis shaft member through an adjustable screw and slot combination.

11. The relay of claim 1 in which the adjustable sensitivity means arranged to modify the rate of positioning of one of the couple elements by its positioning beam includes, (a) an angularly movable sector having an axis shaft member extending through the support wall, (b) an electro-motive means mounted on the other side of the wall and responsive to remotely established electric signals, (c) a cam pivoted by the electro-motive means about a point fixed with respect to the wall, and (d) a roller arm fixed to the axis shaft member and positioned by the cam.

References Cited in the file of this patent

UNITED STATES PATENTS

| | | |
|---|---|---|
| 2,679,829 | Gorrie et al. | June 1, 1954 |
| 2,717,611 | Lerousseau et al. | Sept. 13, 1955 |
| 2,743,710 | Shannon | May 1, 1956 |
| 2,776,669 | Gorrie | Jan. 8, 1957 |

UNITED STATES PATENT OFFICE
CERTIFICATE OF CORRECTION

Patent No. 2,867,229                                                          January 6, 1959

Jack F. Shannon

It is hereby certified that error appears in the printed specification of the above numbered patent requiring correction and that the said Letters Patent should read as corrected below.

Column 1, line 66, for "half" read -- halve --; column 8, line 59, after "extending" insert -- between --.

Signed and sealed this 7th day of July 1959.

(SEAL)
Attest:

KARL H. AXLINE                                               ROBERT C. WATSON

Attesting Officer                                        Commissioner of Patents